(12) United States Patent
Jones et al.

(10) Patent No.: US 10,518,796 B2
(45) Date of Patent: *Dec. 31, 2019

(54) SYSTEMS AND METHODS FOR MONITORING SHOPPING CART WHEELS

(71) Applicant: Walmart Apollo, LLC, Bentonville, AR (US)

(72) Inventors: Nicholaus Adam Jones, Fayetteville, AR (US); Matthew Dwain Biermann, Fayetteville, AR (US); Steven Jackson Lewis, Bentonville, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 18 days.

This patent is subject to a terminal disclaimer.

(21) Appl. No.: 16/141,487

(22) Filed: Sep. 25, 2018

(65) Prior Publication Data
US 2019/0031223 A1 Jan. 31, 2019

Related U.S. Application Data

(63) Continuation of application No. 15/835,958, filed on Dec. 8, 2017, now Pat. No. 10,118,635.

(Continued)

(51) Int. Cl.
G08B 21/00 (2006.01)
B62B 5/00 (2006.01)
G01C 21/20 (2006.01)
B62B 3/14 (2006.01)
G07C 3/00 (2006.01)
(Continued)

(52) U.S. Cl.
CPC .......... B62B 5/0096 (2013.01); B62B 3/1404 (2013.01); G01C 21/206 (2013.01); G01H 3/00 (2013.01); G07C 3/00 (2013.01); G07C 3/14 (2013.01)

(58) Field of Classification Search
CPC ... B62B 5/0096; B62B 3/1404; G01C 21/206; G07C 3/14; G07C 3/00; B26D 5/0423; B26D 5/06; B26D 3/14; B60R 16/0307; H04W 4/021; H04W 84/12; B60Y 2200/86; B60Y 2400/308; B60Y 2400/112; B60Y 2300/60; G01H 3/00
USPC .................. 340/540, 539.1, 539.13, 539.16; 235/385, 383; 280/33.994, 33.992, 280/33.998, 33.95
See application file for complete search history.

(56) References Cited

U.S. PATENT DOCUMENTS 6,581,466 B1  6/2003 Costley et al.
8,930,065 B2  1/2015 Argue et al.
(Continued)

FOREIGN PATENT DOCUMENTS

WO  2013/142896 A1  10/2013
WO  2016/055815 A1  4/2016

Primary Examiner — Anh V La
(74) Attorney, Agent, or Firm — McCarter & English, LLP; David R. Burns; Sean R. MacDavitt

(57) ABSTRACT

Methods and systems are provided for evaluating shopping cart wheels using a sensor module or one or more microphones engaged with the shopping cart. The microphones can be used to detect sounds generated by the wheels of the shopping cart. A sound signature can be determined from the detected sound and compared to sound signatures in a database. If the detected sound indicates that a wheel of the shopping cart is failing, an alert can be generated using an associate alert system.

19 Claims, 5 Drawing Sheets

Related U.S. Application Data

(60) Provisional application No. 62/456,805, filed on Feb. 9, 2017.

(51) Int. Cl.
*G01H 3/00* (2006.01)
*G07C 3/14* (2006.01)

(56) References Cited

U.S. PATENT DOCUMENTS

| | | |
|---|---|---|
| 8,973,716 B2 | 3/2015 | McKay et al. |
| 9,322,658 B2 | 4/2016 | Hannah et al. |
| 9,403,548 B2 | 8/2016 | Hannah et al. |
| 10,118,635 B2 * | 11/2018 | Jones ................ G01H 3/00 |
| 2004/0221790 A1 | 11/2004 | Sinclair et al. |
| 2008/0231432 A1 * | 9/2008 | Stawar ............. B62B 3/1408 |
| | | 340/425.5 |
| 2009/0179760 A1 | 7/2009 | Nebolon et al. |
| 2014/0108195 A1 | 4/2014 | Stawar et al. |
| 2014/0167960 A1 | 6/2014 | Argue et al. |
| 2014/0172555 A1 * | 6/2014 | Argue .............. G06Q 30/0633 |
| | | 705/14.49 |
| 2014/0244207 A1 * | 8/2014 | Hicks ................ G01C 3/00 |
| | | 702/150 |
| 2016/0009169 A1 | 1/2016 | Biderman et al. |
| 2018/0222514 A1 | 8/2018 | Jones et al. |

* cited by examiner

SYSTEMS AND METHODS FOR MONITORING SHOPPING CART WHEELS

RELATED APPLICATIONS

This application is a continuation of U.S. application Ser. No. 15/835,958, filed Dec. 8, 2017, which claims priority to U.S. Provisional Application No. 62/456,805, filed Feb. 9, 2017, the contents of each of the above applications being incorporated herein by reference in its entirety.

BACKGROUND

Vendors provide shopping carts for customer convenience as the customer shops in the store. The wheels of the shopping carts may dull or run unevenly over time, necessitating replacement or repair.

BRIEF DESCRIPTION OF DRAWINGS

Illustrative embodiments are shown by way of example in the accompanying drawings and should not be considered as a limitation of the present disclosure.

DETAILED DESCRIPTION

Described in detail herein are methods and systems for evaluating one or more wheels of a shopping cart using a sensor module engaged or integrated with the shopping cart. For example, embodiments of the sensor module can include one or more microphones that are configured to detect sounds generated by the wheels of the shopping cart. The sensor module can emit wireless transmissions in response to the detected sounds that are received, directly or indirectly, at a server. The server can generate an alert using an associate alert system if at least one of the wheels is failing.

Figure 1:
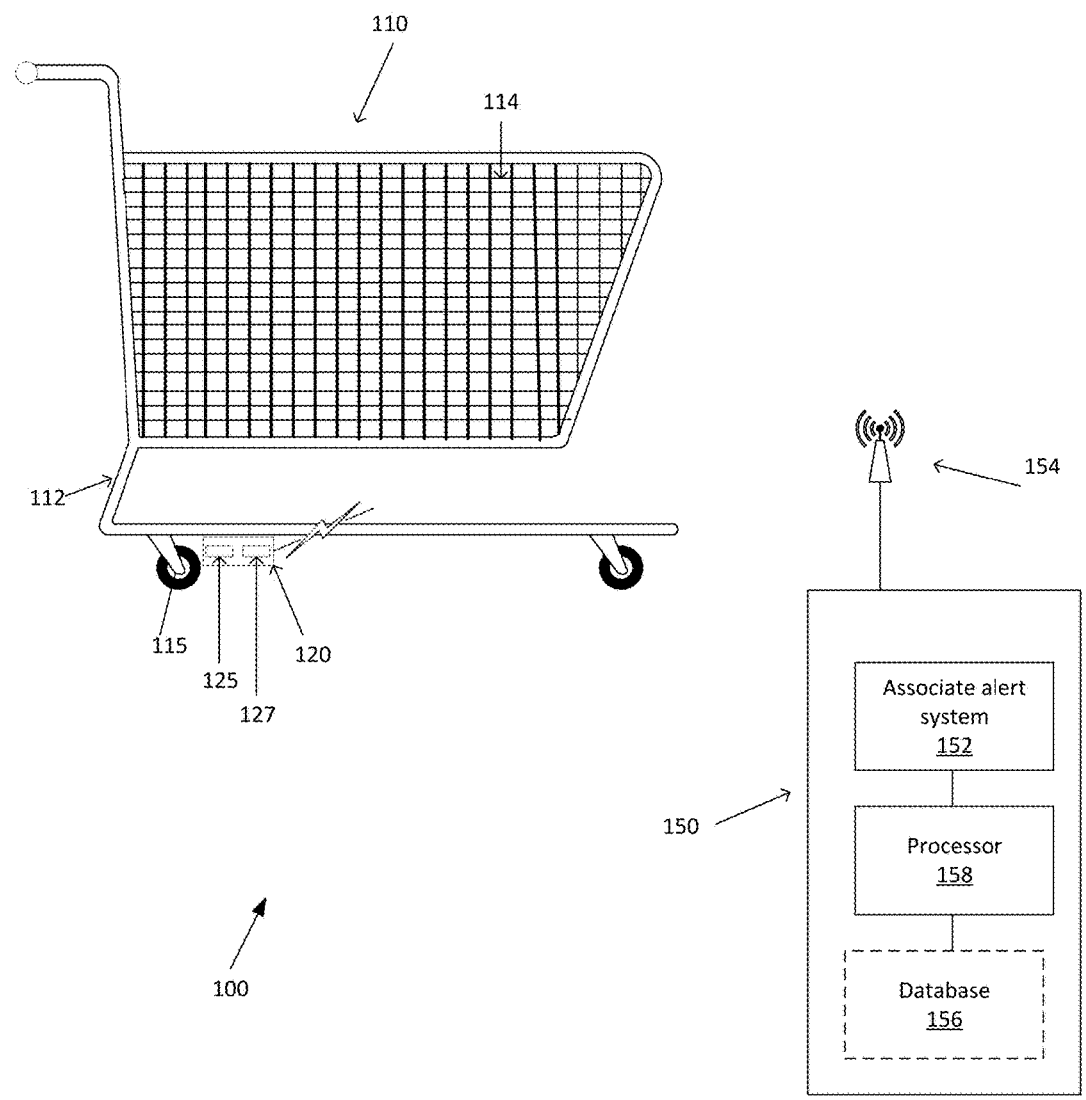
FIG. 1 illustrates a system for monitoring the status of a wheel of a manually-driven shopping cart according to various embodiments of the present disclosure.

FIG. 1 illustrates a system 100 for monitoring the status of a wheel of a manually-driven shopping cart according to various embodiments of the present disclosure. The system 100 can include a shopping cart 110 having wheels 115, a sensor module 120, and a server 150. The sensor module 120 can engage with the shopping cart 110 and include one or more microphones 125 and a communication module 127. The server can include a wireless receiver 154, a processor 158, and an associate alert system 152. The sensor module 120 can communicate signals to the server 150 in response to sounds detected by the one or more microphones 125. The server 150 can generate an alert using the associate alert system 152 if the received signals indicate that at least one of the wheels 115 of the shopping cart 110 is failing. An exemplary embodiment of a server 150 for use with the systems and methods provided herein is described below with relation to FIG. 3.

The shopping cart 110 can include a frame 112, a basket 114 supported by the frame 112, and wheels 115 configured to support the frame 112. In some embodiments, the shopping cart 110 or its component parts can be characterized and identified by level of prior use, e.g., an original part vs. a replacement or refurbished part.

The sensor module 120 can engage with the shopping cart 110 at various locations on the shopping cart 110. For example, the sensor module 120 can be located on the underside of the frame 112 as shown in FIG. 1. In other embodiments, the sensor module 120 can be located on or below the basket 114 or near a handle of the shopping cart 110. The sensor module 110 can include one or more microphones 125 that are positioned on the shopping cart 110 to detect sounds generated by the wheels 115 of the shopping cart 110. In some embodiments, the one or more microphones 125 can be placed at the same location on the shopping cart 110. Alternatively, or in addition, one or more of the microphones 125 (e.g., a first microphone, second microphone, third microphone . . . ) can be aimed or oriented towards a different one of the wheels 115 of the shopping cart 110 to detect sounds emanating from that wheel. In other embodiments, each of the plurality of microphones 125 can be placed near one of the wheels 115.

Figure 2:
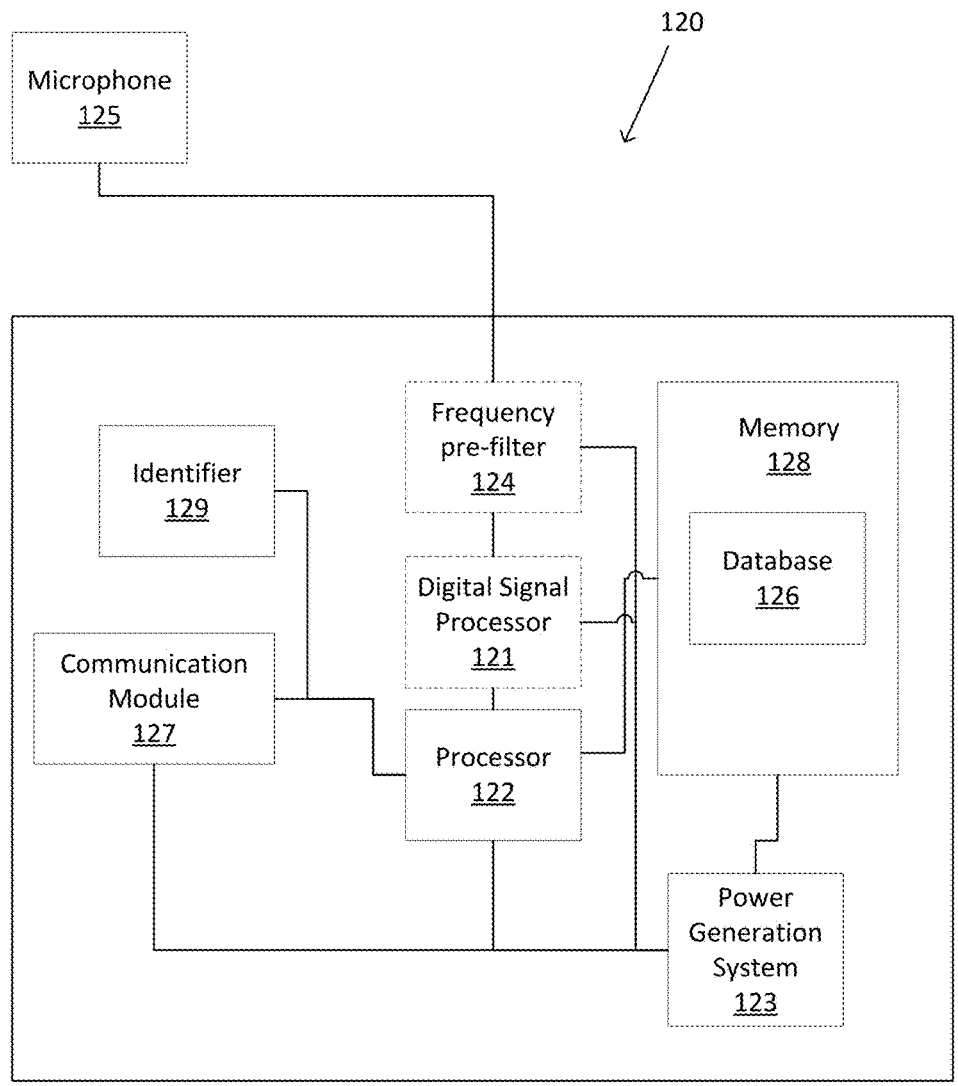
FIG. 2 illustrates a sensor module for with systems and methods described herein according to various embodiments of the present disclosure.

FIG. 2 illustrates the sensor module 120 for use with the systems and methods described in various embodiments herein. The sensor module 120 can use the communication module 127 to emit wireless transmissions in response to the sounds detected by the one or more microphones 125. In some embodiments, the wireless transmissions can include transmissions via WiFi (e.g., a variety of 802.11x), Bluetooth®, or other wireless transmission standards. The communication module 127 can include an antenna. The wireless transmissions can include signals associated with the sounds generated by the wheels 115 that were detected by the microphones 125. In some embodiments, the wireless transmissions include sound signatures derived by the sensor module 120 from the received signals associated with sounds generated by the wheels 115 as described in greater detail below.

In various embodiments, referring now to FIGS. 1 and 2, the wireless receiver 154 of the server 150 can receive the wireless transmissions from the sensor module 120. If the signals in the wireless transmissions received by the wireless receiver 154 indicate that at least one of the wheels 115 of the shopping cart 110 is failing, the server 150 can generate an alert using the associate alert system 152.

In accordance with various embodiments, a sound signature can be derived from the signals associated with detected sounds. Derivation of the sound signature can be performed by a processor 122 onboard the sensor module 120, by a processor 158 of the server 150, or by both processors 122 and 158. In some embodiments, the sensor module 120 can include the processor 122 and a memory 128 including a database 126 of sound signatures. In such embodiments, the processor 122 can receive, from the one or more microphones 125, signals associated with the sounds generated by the wheels 115. The processor 122 can derive a sound signature from the received signals. For example, the sound signature can include amplitude data, frequency data, Fourier transform data associated with a time varying electrical signal generated by the microphone(s) in response to the sound emanating from the wheel(s), time-series data associated with a time varying electrical signal generated by the microphone(s) in response to the sound emanating from the wheel(s), or other data representative of the received sounds. In some embodiments, the sound signature can include digitized portions of the received sounds. In some embodiments, the processor 122 can compare signals from a first one of the microphones 125 and a second one of the microphones to identify a wheel from among the wheels 115 on the shopping cart 110. For example, a time delay may be measured between detection of the sound at the first one of the microphones 125 and the second one of the microphones 125, and the time delay can be used to assess the direction from which the detected sound arrived at the microphones 125. In such embodiments, the signals associated with the detected sound that are transmitted wirelessly can include the identity of the failing wheel that is generating a sound.

In some embodiments, one or more of the wheels 115 of the shopping cart 110 can emit a detectable sound or change in sound as the wheel 115 rotates when worn beyond a certain point. For example, a wheel 115 can comprise at least two materials wherein a first material overlies a second material. A detectable sound or change in sound can occur when the first material is worn away from the wheel 115 through use. In some embodiments, the first material can include rubbers or plastics and the second material can comprise plastics or metals. The detectable sound or change in sound can be emitted at a frequency above or below the usual thresholds of human hearing in some embodiments. In some embodiments, wear to the wheel 115 can expose structures formed in the wheel such as ridges, nubs, or other structures that produce a detectable sound or change in sound when the wheel is rotating. The detectable sound or change in sound produced by the worn wheel 115 can be time-periodic in some embodiments.

In some embodiments, the processor 122 can compare the sound signature of the received sounds to a signature in the database 126 of sound signatures. In accordance with various embodiments, the database 126 of sound signatures can include sound signatures representative of shopping cart wheels in various states of repair. For example, the database 126 of sound signatures can include sound signatures for new shopping cart wheels and shopping cart wheels that have been used for different periods of time, under different environmental conditions, or that have different degrees of wear. Moreover, some sound signatures in the database 126 of sound signatures can represent shopping cart wheels that are failing in different ways. For example, the sound signatures can represent shopping cart wheels having a flat area on the wheel, having an oval or non-circular shape, having a bad bearing, or having a bad caster.

In some embodiments, the wireless transmissions sent by the communication module 127 of the sensor module 120 can include a result of the comparison between the sound signature of the received sounds and the signature in the database 126 of sound signatures. In some embodiments, the processor 122 can derive a similarity score as the result of the comparison of the sound signature of the received sounds to the signatures in the database 126. In some embodiments, the server 150 can receive the results of the comparison performed by the processor 127 via wireless transmission from the communication module 127. If the result of the comparison (e.g., the similarity score) indicates that the sound signature of the received sounds is similar to a signature in the database 126 associated with failing wheels, the server 150 can generate an alert using the associate alert system 152. For example, an associate might be alerted using a flashing light or by a message appearing on a display. The message can direct the associate the location of the shopping cart or the identity of the shopping cart. In embodiments where an identification of the particular wheel generating the sound has been made, the identity of the wheel can also be indicated to the associate using the associate alert system 150.

In some embodiments, the sensor module 120 can wirelessly transmit signals associated with the detected sounds directly to the server 150 with minimal processing or modification. In such an embodiment, the server 150 can include a database 156 of sound signatures. The processor 158 of the server 150 can derive a sound signature from the received signals and compare the derived sound signature to a signature in the database 156 of sound signatures. The server 150 can then generate an alert using the associate alert system 152 if the results of the comparison indicate that at least one of the wheels is failing.

In some embodiments, the sensor module 120 can include an identifier 129 associated with the shopping cart 110. Information associated with the identifier 129 can be sent as part of the emitted wireless transmissions. For example, the sensor module 120 can include information associated with the identifier 129 that allows unique identification of the shopping cart 110 such as location or serial number.

In accordance with various embodiments, referring again to FIG. 2, the sensor module 120 can include a digital signal processor 121 or a frequency pre-filter 124. The processor 122 can use digital signal processor 121 to measure, filter, or compress the signals associated with sounds detected by the microphones 125. In some embodiments, the processor 122 can use the frequency pre-filter 124 to minimize or eliminate the effect of erroneous sounds on later signal analysis such as derivation of the sound signature. For example, the sound signatures in the database 126 of sound signatures may include frequency spectrum information that lies primarily in a narrow band of audio frequencies or above a certain audio frequency. In such cases, the frequency pre-filter 124 can be configured to pass the preferred band of audio frequencies while rejecting sound at frequencies outside of the bandpass. Similarly, the frequency pre-filter 124 can be configured to reject sound at audio frequencies below a minimal cut-off frequency (i.e., the frequency pre-filter 124 can act as a high-pass filter) or above a maximal frequency (i.e., the frequency pre-filter 124 can act as a low-pass filter).

The sensor module 120 can include a power generation system 123 in some embodiments. The power generation system 123 can provide power to components in the sensor module 120 including the processor 122, the memory 128, the communication module 129, the digital signal processor 121, the frequency pre-filter 124, or other components that require operating power. In various embodiments, the power generation system 123 can generate power from motion of the wheels 115 of the shopping cart 110 (e.g., via electromagnetic generators being integrated with shafts of the wheels), from a solar cell, or from an inductive charging station.

Figure 3:
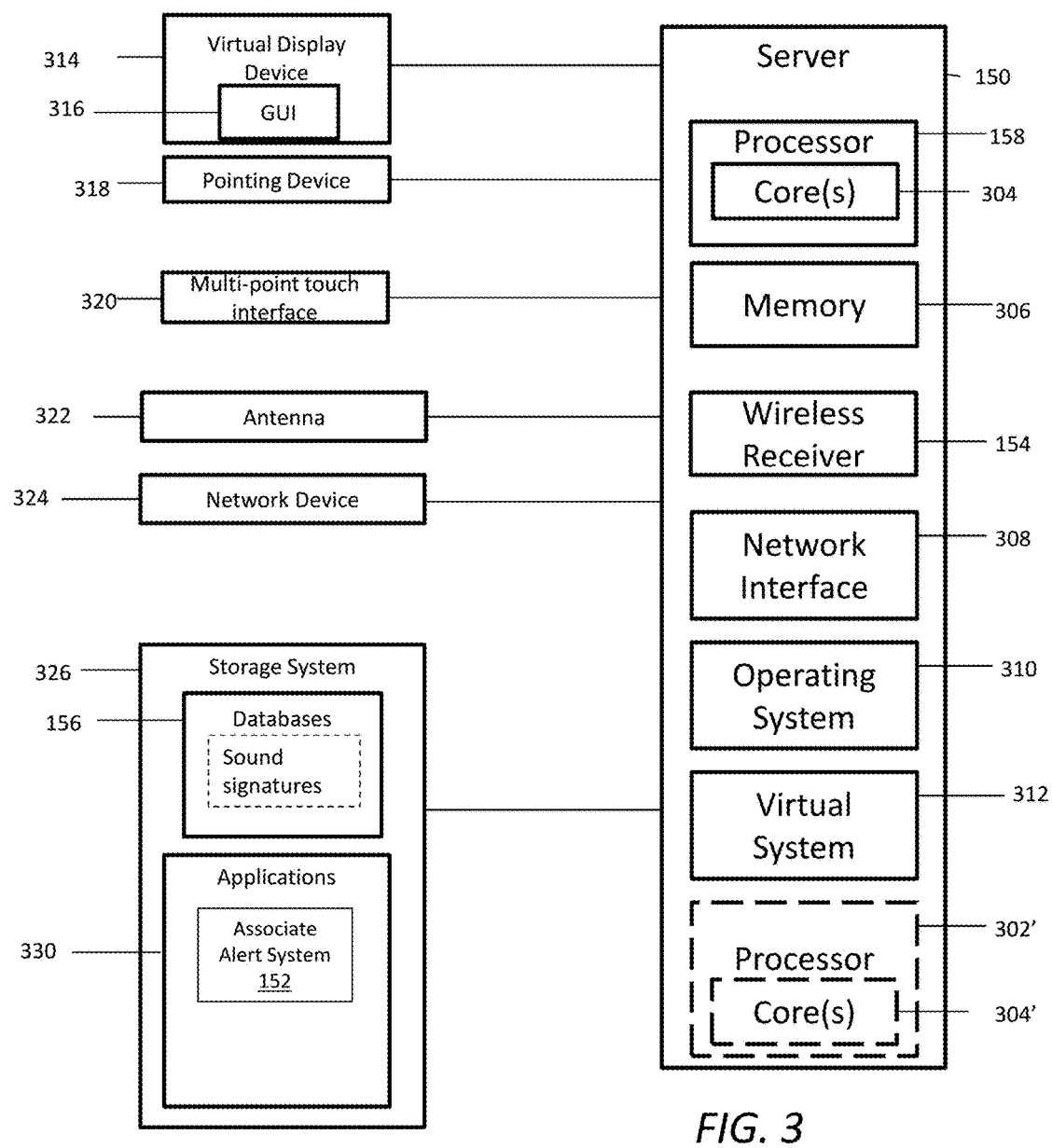
FIG. 3 illustrates an exemplary server for use with systems and methods described herein.

FIG. 3 is a block diagram of an example server 150 for implementing exemplary embodiments of the present disclosure. Embodiments of the server 150 can implement the associate alert system 152. The server 150 can include one or more non-transitory computer-readable media for storing one or more computer-executable instructions or software for implementing exemplary embodiments. The non-transitory computer-readable media may include, but are not limited to, one or more types of hardware memory, non-transitory tangible media (for example, one or more magnetic storage disks, one or more optical disks, one or more flash drives, one or more solid state disks), and the like. For example, memory 306 included in the server 150 may store computer-readable and computer-executable instructions or software (e.g., applications 330 such as the associate alert system 152) for implementing exemplary operations of the server 150.

The server 150 also includes configurable and/or programmable processor 158 and associated core(s) 304, and optionally, one or more additional configurable and/or programmable processor(s) 302' and associated core(s) 304' (for example, in the case of computer systems having multiple processors/cores), for executing computer-readable and computer-executable instructions or software stored in the memory 306 and other programs for implementing exemplary embodiments of the present disclosure. Processor 158 and processor(s) 302' may each be a single core processor or multiple core (304 and 304') processor. Either or both of processor 158 and processor(s) 302' may be configured to execute one or more of the instructions described in connection with server 150.

Virtualization may be employed in the server 150 so that infrastructure and resources in the server 150 may be shared dynamically. A virtual machine 312 may be provided to handle a process running on multiple processors so that the process appears to be using only one computing resource rather than multiple computing resources. Multiple virtual machines may also be used with one processor.

Memory 306 may include a computer system memory or random access memory, such as DRAM, SRAM, EDO RAM, and the like. Memory 306 may include other types of memory as well, or combinations thereof.

A user may interact with the server 150 through a visual display device 314, such as a computer monitor, which may display one or more graphical user interfaces 316, multi touch interface 320 and a pointing device 318.

The server 150 may also include one or more storage devices 326, such as a hard-drive, CD-ROM, or other computer readable media, for storing data and computer-readable instructions and/or software that implement exemplary embodiments of the present disclosure (e.g., applications). For example, exemplary storage device 326 can include one or more databases 156 for storing information including the detected sounds, signals associated with the detected sounds, or pre-determined sound signatures or patterns. The databases 156 may be updated manually or automatically at any suitable time to add, delete, and/or update one or more data items in the databases.

The server 150 can include a network interface 308 configured to interface via one or more network devices 324 with one or more networks, for example, Local Area Network (LAN), Wide Area Network (WAN) or the Internet through a variety of connections including, but not limited to, standard telephone lines, LAN or WAN links (for example, 802.11, T1, T3, 56 kb, X.25), broadband connections (for example, ISDN, Frame Relay, ATM), wireless connections, controller area network (CAN), or some combination of any or all of the above. In exemplary embodiments, the server can include one or more antennas 322 to facilitate wireless communication (e.g., via the network interface 308 or wireless receiver 154) between the server 150 and a network and/or between the server 150 and the sensor module 120. The network interface 308 or wireless receiver 154 may include a built-in network adapter, network interface card, PCMCIA network card, card bus network adapter, wireless network adapter, USB network adapter, modem or any other device suitable for interfacing the server 150 to any type of network capable of communication and performing the operations described herein.

The server 150 may run any operating system 310, such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, or any other operating system capable of running on the server 150 and performing the operations described herein. In exemplary embodiments, the operating system 310 may be run in native mode or emulated mode. In an exemplary embodiment, the operating system 310 may be run on one or more cloud machine instances.

Figure 4:
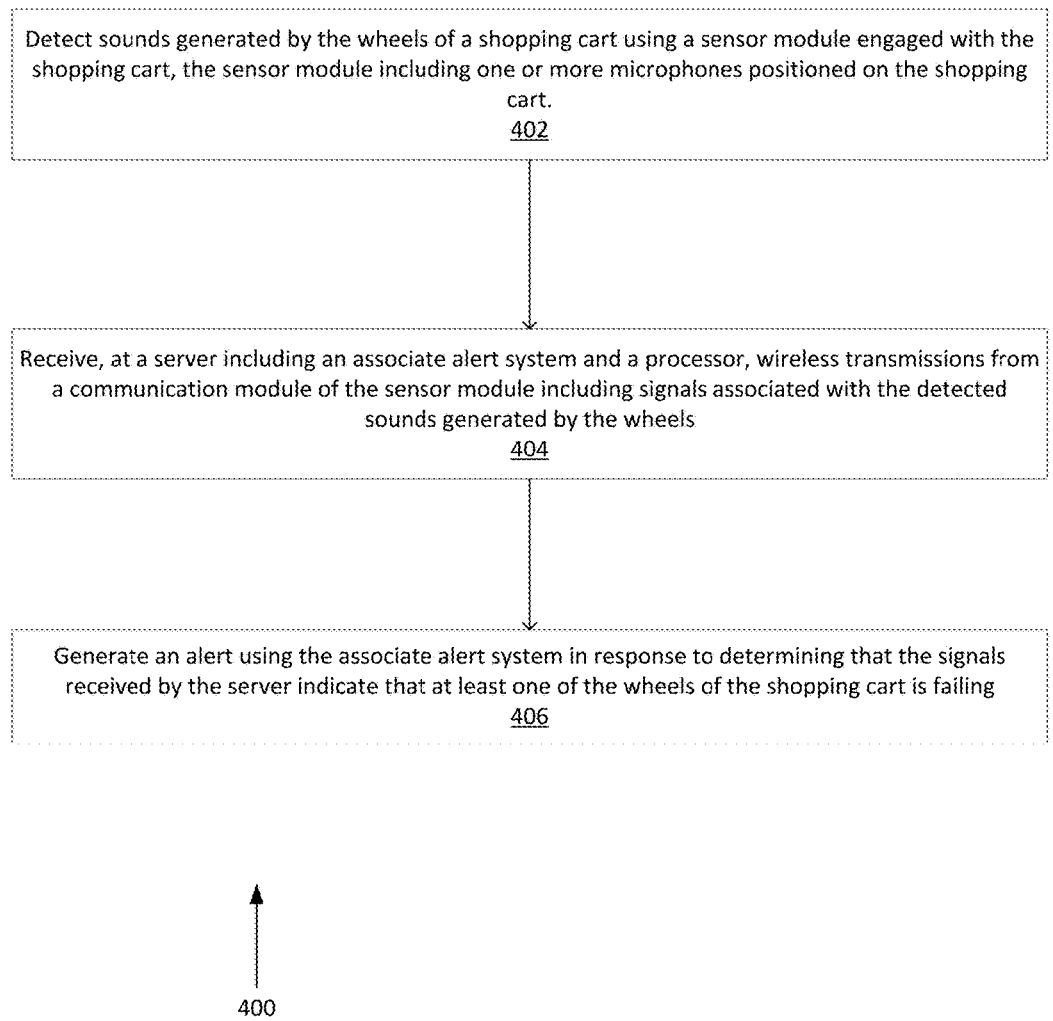
FIG. 4 illustrates an exemplary method for monitoring the status of a wheel of a manually driven shopping cart according to various embodiments of the present disclosure.

FIG. 4 illustrates an exemplary method 400 for monitoring the status of a wheel of a manually driven shopping cart according to various embodiments of the present disclosure. The method includes detecting sounds generated by the wheels of a shopping cart using a sensor module engaged with the shopping cart (step 402). The sensor module includes one or more microphones positioned on the shopping cart. In various embodiments, detection of the sounds generated by the wheels of the shopping cart can include, but is not limited to, using the sensor module 120 and microphones 125 as described above with reference to FIG. 1. The method also includes receiving, at a server (e.g., embodiments of the server 150 shown in FIGS. 1 and 3), wireless transmissions from a communication module of the sensor module (e.g., embodiments of the communication module 127 of the sensor module 120 shown in FIGS. 1 and 2) including signals associated with the detected sounds generated by the wheels (step 404).

The method also includes generating an alert using the associate alert system of the server in response to determining that the signals received by the server indicate that at least one of the wheels of the shopping cart is failing (step 406).

Figure 5:
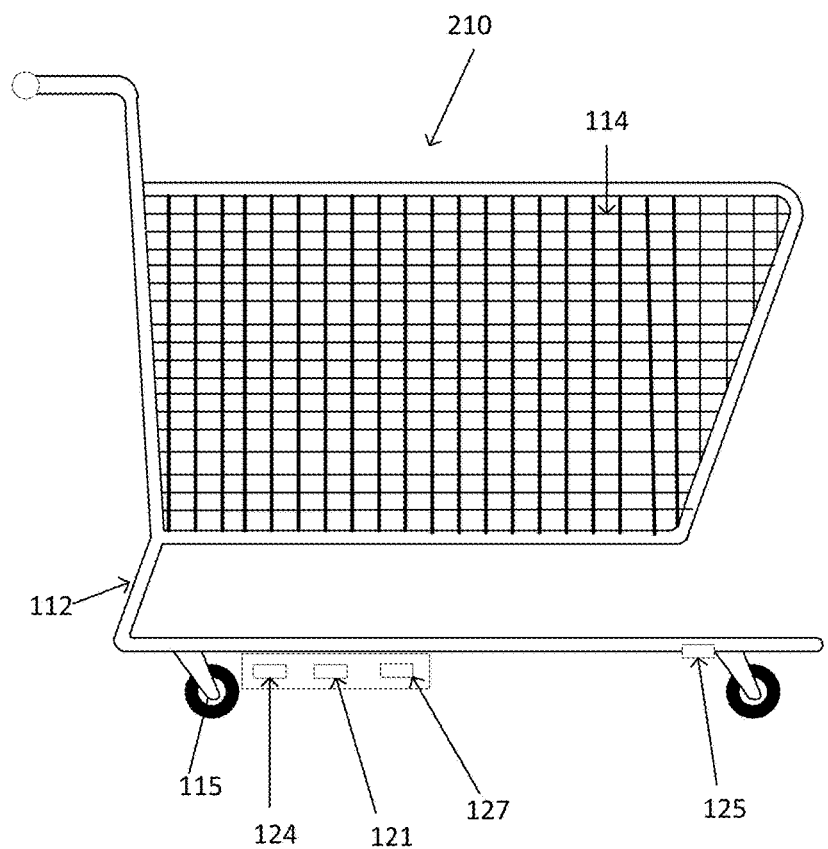
FIG. 5 illustrates a shopping cart including microphones according to various embodiments of the present disclosure.

FIG. 5 illustrates a shopping cart including microphones according to various embodiments of the present disclosure. The shopping cart 210 can include a frame 112, a basket supported by the frame 114, and wheels 115 configured to support the frame 112. The shopping cart 210 can also include one or more microphones 125, a frequency pre-filter 124, a communication module 127, and a digital signal processor 121. The digital signal processor can control the communication module 127 to transmit a communication corresponding to the signals output by the one or more microphones to a server.

In some embodiments, the microphone(s) 125 of the shopping cart 210 can be disposed on the frame or the basket. In some embodiments, the microphones 125 can be positioned to detect sounds generated by rotation of at least one of the wheels 115. For example, one of the microphones 125 can be positioned near each wheel 115 to detect sounds produced by the rotation of that wheel. In some embodiments, sounds produced by a rotating cart wheel can be indicative of the health or wear of the cart wheel. For example, a cart wheel that has a dull spot on the perimeter can produce a periodic thudding or clunking sound.

The frequency pre-filter 124 can be configured to filter signals output by the one or more of the microphones 115 in some embodiments. For example, the frequency pre-filter 124 can be configured to eliminate high frequencies or low frequencies. In some embodiments, the frequency pre-filter 124 can be configured to pass a preferred band of audio frequencies while rejecting sound at frequencies outside of the bandpass. Similarly, the frequency pre-filter 124 can be configured to reject sound at audio frequencies below a minimal cut-off frequency (i.e., the frequency pre-filter 124 can act as a high-pass filter) or above a maximal frequency (i.e., the frequency pre-filter 124 can act as a low-pass filter).

The digital signal processor 121 can be operatively coupled to the microphones 115 via the frequency pre-filter 124 in some embodiments. The digital signal processor 121 can be operatively coupled to the communication module 127 in some embodiments. The digital signal processor 121 can process the filtered signal corresponding to the signals output by the microphones to produce a message corresponding to the signals output by the one or more microphones to a server. The digital signal processor 121 can then control the communication module 127 to transmit that communication to a server.

In describing exemplary embodiments, specific terminology is used for the sake of clarity. For purposes of description, each specific term is intended to at least include all technical and functional equivalents that operate in a similar manner to accomplish a similar purpose. Additionally, in some instances where a particular exemplary embodiment includes a plurality of system elements, device components or method steps, those elements, components or steps may be replaced with a single element, component, or step. Likewise, a single element, component, or step may be replaced with a plurality of elements, components, or steps that serve the same purpose. Moreover, while exemplary embodiments have been shown and described with references to particular embodiments thereof, those of ordinary skill in the art will understand that various substitutions and alterations in form and detail may be made therein without departing from the scope of the present disclosure. Further still, other aspects, functions, and advantages are also within the scope of the present disclosure.

Exemplary flowcharts are provided herein for illustrative purposes and are non-limiting examples of methods. One of ordinary skill in the art will recognize that exemplary methods may include more or fewer steps than those illustrated in the exemplary flowcharts, and that the steps in the exemplary flowcharts may be performed in a different order than the order shown in the illustrative flowcharts.

The invention claimed is:

1. A system for monitoring the status of one or more wheels of a shopping cart, the system comprising:
    a shopping cart including a frame and wheels configured to support the frame;
    one or more microphones positioned on the shopping cart to detect sounds generated by the wheels of the shopping cart;
    a communication module engaged with the shopping cart, the communication module configured to receive information related to the sounds detected by the one or more microphones and configured to emit wireless transmissions including the information;
    a wireless receiver configured to receive the wireless transmissions from the communication module; and
    a server in communication with the wireless receiver, the server including an associate alert system and a processor that can execute instructions to:
        receive the wireless transmissions from the communication module via the wireless receiver, the wireless transmissions including signals associated with the sounds generated by the wheels detected by the one or more microphones; and
        generate an alert using the associate alert system in response to determining that the signals received by the server indicate that at least one of the wheels of the shopping cart is failing.

2. The system of claim 1, wherein the communication module further comprises an identifier associated with the shopping cart, and wherein the communication module is configured to emit wireless transmissions including the identifier.

3. The system of claim 1, further comprising a memory including a database of sound signatures and a processor to execute instructions to:
    receive signals associated with the sounds generated by the wheels detected by the one or more microphones;
    derive a sound signature from the received signals;
    compare the sound signature of the received signals to a signature in the database of sound signatures; and
    send the results of the comparison to the communication module for transmission to the wireless receiver.

4. The system of claim 1, wherein the alert is generated by:
    deriving a sound signature from the signals received via wireless transmission; and
    comparing the sound signature to a signature in a database of sound signatures; wherein the alert is generated when the comparison indicates that at least one of the wheels is failing.

5. The system of claim 4, wherein the one or more microphones include a first microphone and a second microphone.

6. The system of claim 5, wherein a sound signature is derived by comparing signals from the first microphone and the second microphone to identify a wheel from among the plurality of wheels on the shopping cart.

7. The system of claim 5, wherein the alert indicates the identified wheel to the associate.

8. The system of claim 1, further comprising one or more of a digital signal processor or a frequency pre-filter electrically disposed between the one or more microphones and the communication module.

9. The system of claim 1, further comprising a power generation system supplying power to the communication module.

10. The system of claim 9, wherein the power generation system generates power from motion of a cart wheel, a solar cell, or an inductive charging station.

11. A shopping cart, comprising:
    a frame;
    a plurality of wheels configured to support the frame;
    one or more microphones disposed on the frame and positioned proximate to one or more of the plurality of wheels to detect sounds generated by rotation of at least one of the wheels;
    a communication module disposed on the frame; and
    a processor disposed on the frame that is operatively coupled to the one or more microphones and is operatively coupled to the communication module, the processor configured to execute instructions to:
        receive signals corresponding to detected sounds output by the one or more microphones;
        control the communication module to transmit a message to a server including information related to the received signals by the one or more microphones.

12. The shopping cart of claim 11, further comprising a frequency pre-filter configured to filter signals output by the one or more microphones.

13. The shopping cart of claim 11, wherein the communication module further comprises an identifier associated with the shopping cart and wherein the communication module is configured to emit wireless transmissions including the identifier.

14. The shopping cart of claim 11, wherein the processor is operatively coupled to a memory including a database of sound signatures and the processor is further configured to execute instructions to:
  derive a sound signature from the received signals; and
  compare the sound signature of the received signals to a signature in the database of sound signatures to generate information related to the received signals including the sound signature.

15. The shopping cart of claim 14, wherein the one or more microphones includes a first microphone and a second microphone.

16. The shopping cart of claim 15, wherein deriving a sound signature from the received signals includes comparing signals from the first microphone and the second microphone to identify a wheel from among the plurality of wheels on the shopping cart.

17. The shopping cart of claim 16, wherein the message transmitted by the communication module to the server includes an indication of the identified wheel.

18. The shopping cart of claim 11, further comprising a power generation system operatively coupled to the processor and the communication module.

19. The shopping cart of claim 18, wherein the power generation system generates power from motion of at least one of the plurality of wheel, a solar cell, or an inductive charging station.

* * * * *